US012654594B2

(12) United States Patent
Guo et al.

(10) Patent No.: US 12,654,594 B2
(45) Date of Patent: Jun. 16, 2026

(54) ANTI-MISUSE SYSTEM, CONTROL SYSTEM, CHILD SAFETY SEAT, ANTI-MISUSE CONTROL METHOD AND METHOD FOR CONTROLLING CHILD SAFETY SEAT

(71) Applicant: WONDERLAND SWITZERLAND AG, Steinhausen (CH)

(72) Inventors: Zhengwen Guo, Steinhausen (CH); Manqun Cheng, Steinhausen (CH); Tao Wang, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 243 days.

(21) Appl. No.: 18/705,023

(22) PCT Filed: Oct. 27, 2022

(86) PCT No.: PCT/EP2022/080062
§ 371 (c)(1),
(2) Date: Apr. 26, 2024

(87) PCT Pub. No.: WO2023/073093
PCT Pub. Date: May 4, 2023

(65) Prior Publication Data
US 2025/0001904 A1      Jan. 2, 2025

(30) Foreign Application Priority Data
Oct. 27, 2021      (CN) ......................... 202111257957.0

(51) Int. Cl.
*B60N 2/00*          (2006.01)
*B60N 2/02*          (2006.01)
(Continued)

(52) U.S. Cl.
CPC ......... *B60N 2/003* (2023.08); *B60N 2/02253* (2023.08); *B60N 2/2857* (2013.01); *B60N 2/2869* (2013.01); *B60Q 9/00* (2013.01)

(58) Field of Classification Search
CPC .. B60N 2/003; B60N 2/02253; B60N 2/2857; B60N 2/2869; B60N 2/28; B60N 2/002; B60N 2/0244; B60Q 9/00
See application file for complete search history.

(56) References Cited

U.S. PATENT DOCUMENTS 6,678,600 B2 *    1/2004 Basir ................. B60R 21/01516
                                                           701/45
2005/0092539 A1 *    5/2005 Chitalia ................. B60N 2/272
                                                           180/271

FOREIGN PATENT DOCUMENTS

CN          109624803 A      4/2019
CN          109835215 A      6/2019
                (Continued)

OTHER PUBLICATIONS

International Search Report issued in corresponding International Application No. PCT/EP2022/080062, dated Feb. 16, 2023, pp. 1-3, European Patent Office, Rijswijk, Netherlands.
(Continued)

*Primary Examiner* — Valentina Xavier
(74) *Attorney, Agent, or Firm* — HAUPTMAN HAM, LLP

(57) ABSTRACT
An anti-misuse system includes: a detection apparatus configured to detect whether a current usage mode of a seat body is a forward usage mode or a backward usage mode; and a reminding apparatus coupled to the detection apparatus, and configured to execute a reminding operation according to the current usage mode detected by the detection apparatus.

6 Claims, 13 Drawing Sheets

(51) Int. Cl.
    *B60N 2/28*       (2006.01)
    *B60Q 9/00*       (2006.01)

(56)             References Cited

FOREIGN PATENT DOCUMENTS

| | | | | | |
|---|---|---|---|---|---|
| CN | 210116412 | U | 2/2020 | | |
| CN | 112519643 | A | 3/2021 | | |
| EP | 0728636 | A1 * | 8/1996 | ............ | B60N 2/002 |
| JP | H09226516 | A | 9/1997 | | |
| JP | H09309374 | A | 12/1997 | | |
| WO | 2018020017 | A2 | 2/2018 | | |

OTHER PUBLICATIONS

Written Opinion issued in corresponding International Application
No. PCT/EP2022/080062, dated Feb. 16, 2023, pp. 1-7, European
Patent Office, Rijswijk, Netherlands.
Taiwan Office Action issued in corresponding Taiwan Application
No. 111140744, dated Jul. 11, 2023, pp. 1-16.
Chinese Office Action issued in corresponding Chinese Application
No. 202111257957.0, dated May 15, 2024, pp. 1-30.
Taiwan Notice of Allowance issued in corresponding Taiwan Appli-
cation No. 111140744, dated Jun. 21, 2024, pp. 1-6.

* cited by examiner

131

110        212

211

1311

131        1312

ANTI-MISUSE SYSTEM, CONTROL SYSTEM, CHILD SAFETY SEAT, ANTI-MISUSE CONTROL METHOD AND METHOD FOR CONTROLLING CHILD SAFETY SEAT

CROSS-REFERENCES TO RELATED APPLICATIONS

This application is a national stage for International Application PCT/EP2022/080062, filed on Oct. 27, 2022, which claims the priority benefit of Chinese Patent Application No. 2021112579570, filed on Oct. 27, 2021. The entireties of the application is incorporated by reference herein for all purposes.

TECHNICAL FIELD

The present disclosure relates to the technical field of children products, and in particular, to an anti-misuse system, a system for controlling a child safety seat, a child safety seat, a method for anti-misuse control of a child safety seat, and a method for controlling a child safety seat.

BACKGROUND

With the increasing popularity of vehicles, such as family cars, the problem of riding safety of children is getting more and more attention from parents. In order to ensure the riding safety of children, merchants produce a child safety seat product. The product provides different usage modes for children of different ages (or body heights, body weights and the like), so as to improve the riding safety of children.

More specifically, the usage mode of the child safety seat may be adjusted according to children of different ages (or body heights, body weights and the like). For example, at present, some international associations or regulations suggest that when an infant who is younger than 2 years old or is lower than 76 cm in body height or is less than 18 kg in body weight use the seat, the seat should be mounted backward, that is, toward the rear of a vehicle; and when an infant who is older than 2 years old or is higher than 76 cm in body height or is greater than 18 kg in body weight use the seat, the seat should be mounted forward, that is, toward the front of the vehicle. Correspondingly, the child safety seat may be adjusted forward and backward, so as to adapt to children of different age, body height, body weight and the like.

However, in actual use, a user often misuses the forward and backward usage modes of the child safety seat, which may lead to a potential safety hazard to the child in the vehicle.

SUMMARY

The purpose of the present disclosure is intended to provide an anti-misuse system, a system for controlling a child safety seat, a child safety seat, a method for anti-misuse control of a child safety seat, and a method for anti-misuse control of a child safety seat, so as to avoid the misuse of a usage mode of the child safety seat.

According to a first aspect, an anti-misuse system is provided, which is applicable to a child safety seat, and includes: a detection apparatus configured to detect whether a current usage mode of a seat body is a forward usage mode or a backward usage mode; and a reminding apparatus coupled to the detection apparatus, and configured to execute a reminding operation according to the current usage mode detected by the detection apparatus.

According to a second aspect, a system for controlling a child safety seat is provided, which includes a controller configured to issue a control instruction; and a driving apparatus coupled to the controller and configured to drive a seat body of the child safety seat to rotate relative to a base of the child safety seat according to the control instruction of the controller, so as to adjust to a forward usage mode or a backward usage mode.

According to a third aspect, a child safety seat is provided, including: a base: a seat body disposed on the base; and an electrical pivoting member including a base pivoting member and a body pivoting member, which are pivoted and coupled to each other. The base pivoting member is disposed on the base, and the body pivoting member is disposed on the seat body, so as to exchange a signal generated by the base with a signal generated by the seat body.

According to a fourth aspect, a method for anti-misuse control of a child safety seat is provided, which includes: determining whether the child safety seat carries a child: when it is determined that the child safety seat carries the child, detecting whether a current usage mode of the child safety seat is a forward usage mode or a backward usage mode by means of a detection apparatus; and executing a reminding operation according to a child attribute of the child.

According to a fifth aspect, a method for controlling a child safety seat is provided, which includes: determining whether the child safety seat carries a child; and when it is determined that the child safety seat carries the child, controlling a seat body of the child safety seat to rotate relative to a base of the child safety seat by means of a driving apparatus, so as to adjust to a forward usage mode or a backward usage mode.

DETAILED DESCRIPTION OF THE EMBODIMENTS

In order to describe the technical content and construction features of the present invention in detail, a further description will be given below in combination with embodiments and with reference to accompanying drawings.

Figure 1:
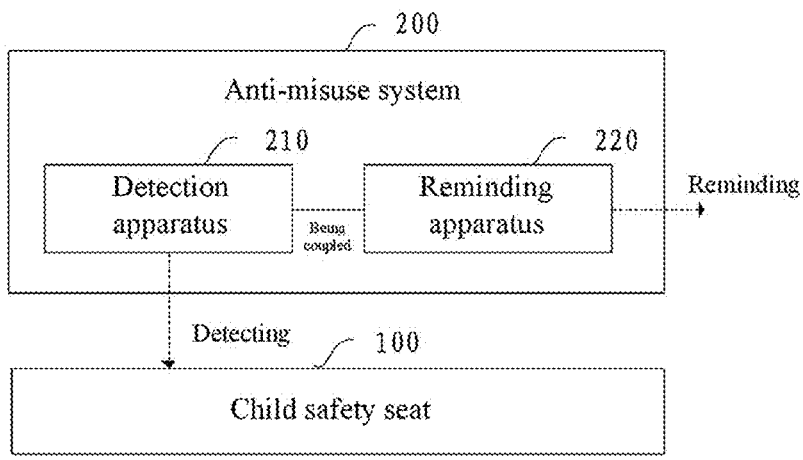
FIG. 1 is a structural block diagram of an anti-misuse system according to an embodiment.

In an embodiment, as shown in FIG. 1, an anti-misuse system 200 is provided, which is applicable to a child safety seat 100. The anti-misuse system 200 includes a detection apparatus 210 and a reminding apparatus 220. The detection apparatus 210 is coupled to the reminding apparatus 220, and the coupling includes a wired or wireless communication connection or signal exchange.

The child safety seat 100 includes a base 110, and a seat body 120 which is disposed on the base 110. The seat body 120 has a forward usage mode and a backward usage mode. The seat body 120 is switched between the forward usage mode and the backward usage mode by rotating the seat body 120 relative to the base 110. The detection apparatus 210 is configured to detect whether the current usage mode of the seat body 120 is the forward usage mode or the backward usage mode. The reminding apparatus 220 is configured to execute a reminding operation according to the current usage mode detected by the detection apparatus 120.

Figure 2:
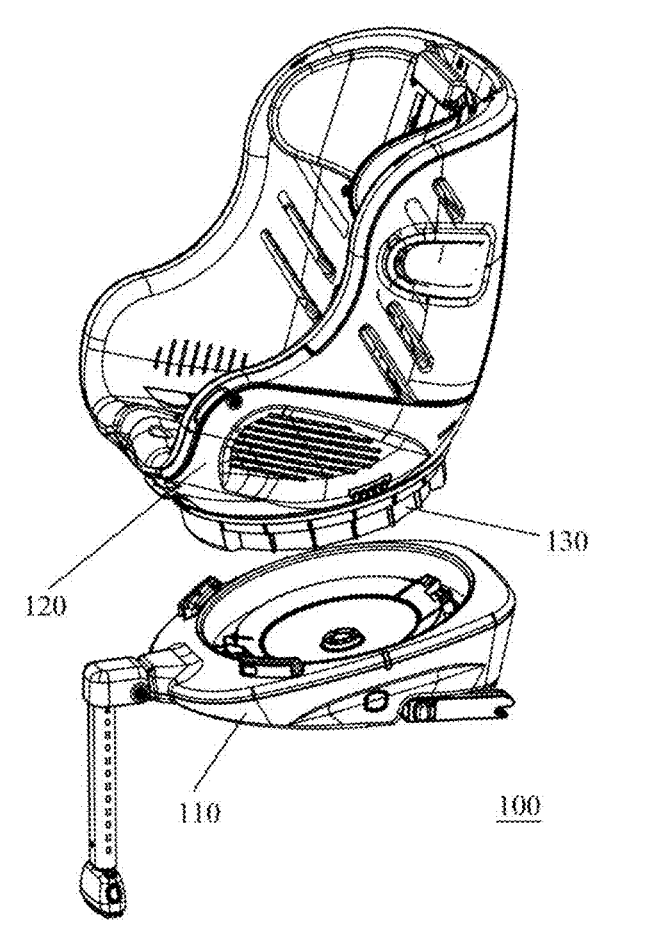
FIG. 2 is a schematic exploded structural diagram of a child safety seat according to an embodiment.
Figure 3A:
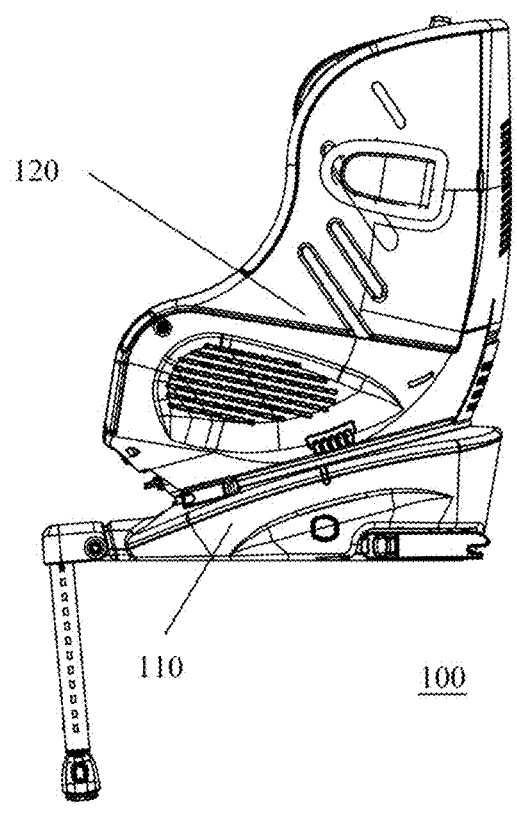
FIG. 3A is a schematic diagram of a forward usage mode of a seat body according to an embodiment.
Figure 3B:
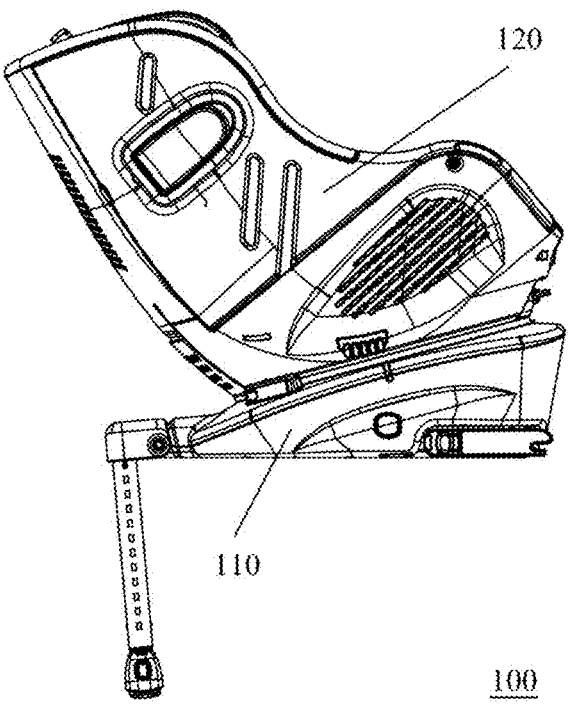
FIG. 3B is a schematic diagram of a backward usage mode of a seat body according to an embodiment.

Specifically, referring to the child safety seat 100 according to an embodiment as shown in FIG. 2, the child safety seat 100 includes a base 110 and a seat body 120, and the seat body 120 is disposed above the base 110. Referring to FIG. 3A and FIG. 3B, the forward usage mode and the backward usage mode of the seat body 120 are shown, respectively. In the forward usage mode shown in FIG. 3A, the seat body 120 faces the front (leftward) of a vehicle; and in the backward usage mode shown in FIG. 3B, the seat body 120 faces the rear (rightward) of the vehicle. The seat body 120 is configured to be rotatable relative to the base 110. A user may switch the seat body 120 between the forward usage mode and the backward usage mode by rotating the seat body 120 relative to the base 110.

The detection apparatus 210 may be configured to detect whether the current usage mode of the seat body 120 is the forward usage mode or the backward usage mode. In practical applications, the detection apparatus 210 may be disposed in the child safety seat 100. Of course, those skilled in the art can set the specific position of the detection apparatus 210 according to actual needs, so as to effectively detect the current usage mode of the seat body 120.

The detection apparatus 210 may be in communication connection with the reminding apparatus 220, and may send a corresponding detection signal to the reminding apparatus 220 upon detecting the current usage mode of the seat body 120.

The reminding apparatus 220 may execute a corresponding reminding operation according to the detection signal, so as to remind the user of content related to the current usage mode of the seat body 120. Those skilled in the art can set the specific position of the detection apparatus 210 according to actual needs, so as to effectively remind the user according to the detection signal of the detection apparatus 210.

After the user perceives a reminding, the user may adjust the usage mode of the seat body 120 according to the content of the reminding, so as to adapt to related attributes (age, body height, body weight and the like) of a child who is currently carried on the child safety seat.

For example, the user may place an infant on the child safety seat in the vehicle and adjust the orientation of the seat body 120 to a certain usage mode. In this case, the detection apparatus 210 detects that the seat body 120 is in the forward usage mode, then the detection apparatus 210 may send a corresponding signal to the reminding apparatus 220, the reminding apparatus 220 may remind the user that the seat is in the forward usage mode via voice, whereas the body weight of the infant using the child safety seat is 10 kg, so that the user may realize that the current usage mode is not adapted to the infant, and thus may re-rotate the seat body 120 to the backward usage mode: or, if the user presets the body weight of the infant to be 10 kg, the reminding apparatus 220 may remind the user that the seat is in the forward usage mode, which is not adapted to the current use object, and the user may re-adjust the orientation of the seat body 120 to the backward usage mode after receiving the reminding.

The above anti-misuse system detects the current usage mode of the seat body by means of the detection apparatus, and then reminds, by means of the reminding apparatus, the user of the information related to the current usage mode, so that the user adjusts, according to the information, the child safety seat to the usage mode that is adapted to the use object, thereby avoiding the user misusing the usage mode of the child safety seat, and thus improving the riding safety of children.

In an embodiment, the anti-misuse system 200 further includes a controller 230.

The controller 230 is configured to determine, according to the detection signal of the detection apparatus, whether the current usage mode is the forward usage mode or the backward usage mode.

The reminding operation includes at least one of the following: current mode reminding, adapted attribute reminding, mode mismatch reminding, attribute reset reminding, and orientation anomaly reminding.

The current mode reminding is used for reminding that the child safety seat is currently in the forward usage mode or the backward usage mode.

The adapted attribute reminding is used for reminding a child attribute which is adapted to the current usage mode of the child safety seat.

The mode mismatch reminding is used for reminding that the current usage mode of the child safety seat is not adapted to the child attribute of the child.

The attribute reset reminding is used for reminding to reset the child attribute of the child.

The orientation anomaly reminding is used for reminding that the orientation of the child safety seat does not conform to the forward usage mode or the backward usage mode.

Specifically, the controller 230 may be disposed in the base 110, or may also be disposed in the seat body 120. The controller 230 may be in communication connection with the detection apparatus 210 by means of a communication module. The communication module may be a wired communication module, or may also be a wireless communication module.

The controller 230 may receive, by means of the communication module, the detection signal sent by the detection apparatus 210, and the controller 230 may determine whether the current usage mode of the seat body 120 is the forward usage mode or the backward usage mode according to the detection signal.

The child attribute may specifically include at least one of age, body weight and body height.

The current usage mode may have a corresponding child attribute. For example, the child attribute corresponding to the forward usage mode may be at least one attribute selected from the group consisting of: the age older than or equal to 15 months, the body weight greater than or equal to 18 Kg, or the body height greater than or equal to 76 cm; and the child attribute corresponding to the backward usage mode may be at least one attribute selected from the group consisting of: the age is younger than 15 months, the body weight is less than 18 kg, or the body height is less than 76 cm.

Specifically, the current mode reminding may be used for reminding the user that the seat body 120 is currently in the forward usage mode or the backward usage mode, the user may use the reminding to determine whether the current usage mode is adapted to the use object, and if the user realizes that the current usage mode is not adapted to the use object, the user may rotate the seat body 120, so as to rotate the seat body 120 to an adapted usage mode.

The adapted attribute reminding may be used for reminding a child attribute which is adapted to the current usage mode, so that the user may be informed of the child attribute corresponding to the current usage mode, and determine whether the child attribute is adapted to the child attribute of the currently carried child, and if the user realizes that the child attribute is not adapted to the child attribute of the currently carried child, the user may rotate the seat body 120, so as to rotate the seat body 120 to the adapted usage mode.

The mode mismatch reminding is used for reminding the user that the current usage mode is not adapted to the acquired child attribute of the currently carried child. The anti-misuse system 200 may be provided with an input apparatus for the user to input the child attribute of the use object, such as the age, body weight and body height, or, the anti-misuse system 200 may be provided with an attribute detection apparatus for automatically detecting the child attribute of the current child, such as the age, body weight and body height, so as to acquire the child attribute of the child who is carried on the child safety seat, and then, the child attribute corresponding to the current usage mode and the child attribute acquired by the attribute detection apparatus may be compared. If the two child attributes being compared do not match, the foregoing mode mismatch reminding is executed, so as to remind the user to rotate the seat body 120 to the adapted usage mode.

When the child carried on the child safety seat 100 is changed, the preset child attribute may be inaccurate. Therefore, the user may be reminded by the attribute reset reminding, so as to reset the child attribute according to the currently carried child.

When the user operates the seat body 120 to rotate, the orientation of the seat body 120 may not be completely rotated to a correct angle to reach the forward usage mode or the backward usage mode. For example, the rotated seat body 120 is not completely right ahead or right astern. Therefore, the user may be reminded by the orientation anomaly reminding that the orientation of the seat body 120 does not conform to either the forward usage mode or the backward usage mode. After receiving the reminding, the user may continue to rotate the seat body 120 by a certain angle, so that the orientation of the seat body 120 conforms the forward usage mode or the backward usage mode.

The above anti-misuse system executes, by means of the reminding apparatus, the reminding operation such as the current mode reminding, the adapted attribute reminding, the mode mismatch reminding, the attribute reset reminding and the orientation anomaly reminding, thereby avoiding the user misusing the usage mode of the child safety seat, and thus improving the riding safety of the child.

In an embodiment, the reminding apparatus 220 includes a reminder disposed on the seat body 120 and/or the base 110. The controller 230 is configured to trigger, according to the current usage mode of the child safety seat 100, the reminder to execute the current mode reminding and/or the adapted attribute reminding, and/or, compare the child attribute of the child who is carried on the child safety seat with the child attribute adapted to the current usage mode, and trigger the reminder to execute the mode mismatch reminding and/or the attribute reset reminding in the case that the two child attributes being compared do not match, and/or, determine an orientation anomaly of the child safety seat 100 according to the detection signal of the detection apparatus 210, and trigger the reminder to execute the orientation anomaly reminding.

Specifically, the reminding apparatus 220 may include one or more reminders, which may be disposed on the seat body 120 or may also be disposed on the base 110, and each of the seat body 120 and the base 110 may be provided with one or more reminder.

After determining the current usage mode of the seat body 120 according to the detection signal of the detection apparatus 210, the controller 230 may send a corresponding signal to the reminder, so as to trigger the reminder to execute the current mode reminding and/or the adapted attribute reminding.

The controller 230 may further compare the child attribute of the child who is currently carried on the child safety seat 100 with the child attribute corresponding to the current usage mode, and trigger the reminder to execute the mode mismatch reminding and/or the attribute reset reminding in the case that the two child attributes being compared do not match.

The controller 230 may further send a corresponding signal to the reminder after determining that the orientation of the seat body 120 is abnormal according to the detection signal, so as to trigger the reminder to execute the orientation anomaly reminding.

In the above anti-misuse system, by means of disposing the reminder on the seat body and/or the base, the user can receive reminding information in time, thereby effectively avoiding the user misusing the usage mode of the child safety seat, and thus improving the riding safety of the child.

In an embodiment, the reminding apparatus 220 includes an external terminal apparatus in communication connection with the controller 230. The controller 230 is configured to transmit information indicating the current usage mode to the external terminal apparatus, and/or, determine an orientation anomaly of the seat body 120 according to the detection signal of the detection apparatus 210, and send orientation anomaly information to the external terminal apparatus. The external terminal apparatus is configured to execute the current mode reminding and/or the adapted attribute reminding according to the current usage mode, and/or, compare the child attribute of the child who is currently carried on the child safety seat with the child attribute adapted to the current usage mode, and execute the mode mismatch reminding and/or the attribute reset reminding in the case that the two child attributes being compared do not match, and/or, execute the orientation anomaly reminding of the seat body according to the orientation anomaly information.

Specifically, the controller 230 may perform a remote communication with one or more external terminal apparatuses by means of the communication module. The external terminal apparatus may be terminals, such as a mobile phone, a tablet computer, a laptop computer, and the like.

After determining the current usage mode of the seat body 120 according to the detection signal of the detection apparatus 210, the controller 230 may transmit the information indicating the current usage mode to one or more external terminal apparatuses. The controller 230 may also send corresponding orientation anomaly information to the one or more external terminal apparatuses, upon determining the orientation anomaly of the seat body 120 according to the detection signal of the detection apparatus 210.

In the above anti-misuse system, the remote communication with the controller and various reminding operations are performed by using an remote communication function and a multimedia playing function of the external terminal apparatus, and there is no need to deploy hardware on the child safety seat for executing reminding, thereby reducing the cost of the child safety seat, meanwhile, the user can receive reminding information in time, thereby avoiding the user misusing the usage mode of the child safety seat, and thus improving the riding safety of the child.

In an embodiment, the reminding apparatus 220 is configured to execute at least one operation of playing reminding voice, displaying reminding characters, displaying a reminding image, or playing a reminding video.

Specifically, the reminding apparatus 220 may include a reminder disposed on the seat body 120 and/or the base 110; and/or an external terminal apparatus in communication connection with the controller 230. It can be understood that, the external terminal apparatus may execute reminding operations such as playing reminding voice, displaying reminding characters, displaying a reminding image, and playing a reminding video in a form of voice, characters, image, video and the like. In addition, the reminder may also execute the reminding operation in the form of voice, characters, image, video and the like. For example, the reminder may be provided with a display screen configured to play the reminding characters, the reminding image, the reminding video, etc. The reminder may further be provided with a loudspeaker for playing the reminding voice.

In the above anti-misuse system, the reminding apparatus is capable of reminding the user in a flexible form, such that the user can receive reminding information in time, thereby avoiding the user misusing the usage mode of the child safety seat, and thus improving the riding safety of the child.

In an embodiment, the anti-misuse system 200 further includes an external terminal apparatus and/or an input device disposed on the child safety seat. The external terminal apparatus and/or the input device is configured to allow the user to input a child attribute which is used for executing the reminding operation.

Specifically, the input device may be disposed on the base 110 or the seat body 120 for the user to input the child attributes, such as the age, body weight and body height, of the child when the child safety seat is used for the first time.

For example, the input device may be provided with a display screen, the display screen has a touch-control function, and the user may input attributes, such as age, body weight and body height, on the display screen. As another example, the input device may be provided with a display screen and an entity key, and the user may input the attributes of the current use object by means of the cooperation of the display screen and the entity key. In addition, the user may also input the attributes of the current use object by using an information input function of the external terminal apparatus. The external terminal apparatus may store the attributes of the current use object, which are input by the user, so as to execute the reminding operation on the basis of the child attribute.

The above anti-misuse system provides a flexible information input method, so that the user can conveniently input the child attributes of the child, so as to realize more accurate reminding, thereby effectively avoiding the user misusing the usage mode of the child safety seat, and thus improving the riding safety of the child. For example, the user can input the date of birth of the child, the system automatically calculates the current age of the child, and the controller 230 compares the calculated age with the age adapted to the current usage mode, and execute the mode mismatch reminding and/or the attribute reset reminding in the case that the two ages being compared do not match.

In an embodiment, the child safety seat 100 includes a detection point. The detection apparatus 210 includes a sensor. One of the sensor and the detection point is disposed on the seat body 120, and the other of the sensor and the detection point is disposed on the base 110. The sensor or the detection point, which is disposed on the seat body 120, is rotated along with the seat body 120. When the seat body 120 is rotated to the forward usage mode or the backward usage mode, the detection point triggers the sensor to generate a detection signal, so as to determine whether the current usage mode is the forward usage mode or the backward usage mode.

Specifically, the sensor may be disposed on the seat body 120 and the detection point may be disposed on the base 110, or the sensor may be disposed on the base 110 and the detection point may be disposed on the seat body 120. In a rotation process of the seat body 120, the sensor or the detection point, which is disposed on the seat body 120, is rotated along with the seat body 120, accordingly, the detection point or the sensor, which is disposed on the base 110, is fixed. When the seat body 120 is rotated relative to the base 10 to the forward usage mode or the backward usage mode, the detection point, which is disposed on the seat body 120 or the base 110, triggers the sensor to generate a corresponding detection signal.

The detection point may trigger the sensor to generate the detection signal in a non-contact manner. For example, the sensor may be an infrared sensor, the detection point may be a light-transmitting notch. When the infrared sensor is aligned with the notch, the infrared sensor is triggered to generate the detection signal. The detection point may also trigger the sensor to generate the detection signal in a contact manner, for example, the sensor may be a mechanical switch sensor which is provided with a switch lever, the detection point may be a protrusion for toggling the switch lever, and when the protrusion toggles the switch lever of the mechanical switch sensor, the mechanical switch sensor is triggered to generate the detection signal. Of course, those skilled in the art can also utilize other specific cooperation manners of the detection point and the sensor to detect the current usage mode, and the specific forms of the detection point and the sensor are not limited in the embodiments of the present disclosure.

In the above anti-misuse system, one of the sensor and the detection point is disposed on the seat body, the other one of the sensor and the detection point is disposed on the base, the detection point is driven by the rotation of the seat body relative to the base to trigger the sensor to generate the detection signal, so as to detect the current usage mode, so that the system is simple in architecture and lower in implementation cost.

In an embodiment, a rotating body 130 is disposed on the bottom of the seat body 120. A rotating framework 131 is disposed on the rotating body 130. The rotating framework 131 is rotated along with the rotating body 130. The detection point is disposed on the rotating framework 131. The sensor is disposed on the base 110.

Figure 4:
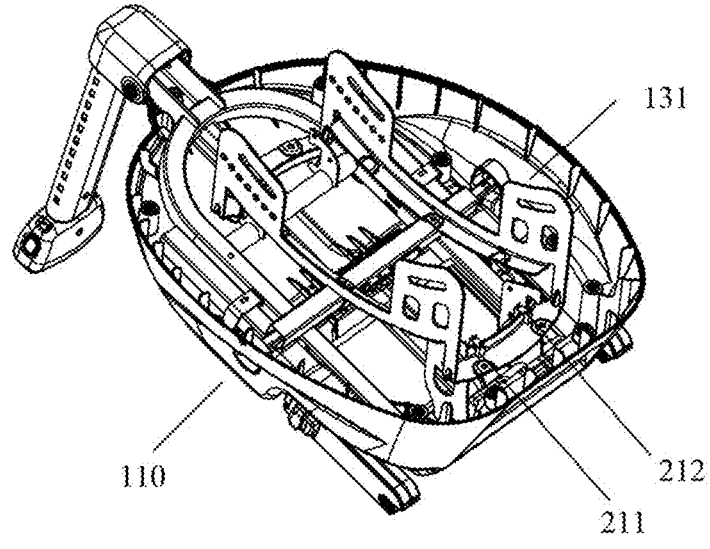
FIG. 4 is a schematic structural diagram of a base of a child safety seat according to an embodiment.

Specifically, referring to FIG. 1 and FIG. 4, the rotating body 130 is disposed on the bottom of the seat body 120, that is, between the seat body 120 and the base 110. The rotation body 130 may be rotated relative to the base 110 along with the seat body 120. The rotating body 130 is provided with the rotating framework 131. The rotating framework 131 is rotated along with the rotating body 130 in the rotation process of the seat body 120.

The rotating framework 131 may be made of a metal material, such as steel. Of course, those skilled in the art can use other materials, such as hard plastic materials.

The base 110 may be provided with at least one sensor for emitting a detection signal when the detection point is detected. More specifically, when the seat body 120 is rotated relative to the base 110, the detection point is accordingly rotated along with the seat body 120. When the seat body 120 is rotated to the forward usage mode or the backward usage mode, the detection point is also rotated along with the seat body 120 to a position detectable by the sensor, so as to trigger the sensor to generate the detection signal.

Figure 5:
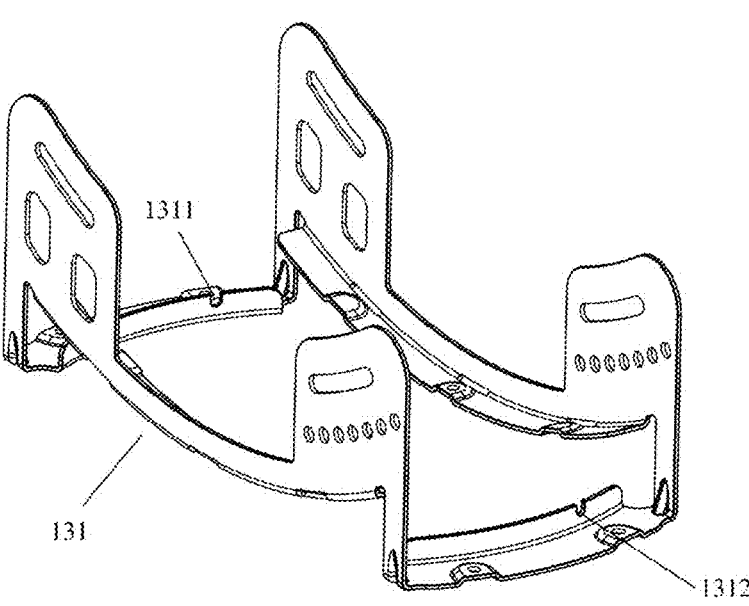
FIG. 5 is a schematic structural diagram of a rotating framework according to an embodiment.

In an embodiment, referring to FIG. 4 and FIG. 5, the sensor includes an infrared sensor. The detection point includes a notch disposed on the rotating framework 131. When the notch is in a sensing range of the infrared sensor, the infrared sensor is triggered to generate the detection signal. The infrared sensor may include a transmitting end and a receiving end, the transmitting end is configured to emit infrared light, and the receiving end is configured to be triggered to generate the detection signal upon receiving the infrared light. The notch is configured to allow the infrared light emitted by the transmitting end to pass through and to reach the receiving end. It can be understood that, in the rotation process of the seat body 120, when the seat body 120 is not rotated to the forward usage mode or the backward usage mode, the part beyond the notch of the rotating framework 131 blocks the infrared light emitted by the transmitting end, so that the infrared light cannot be received by the receiving end. When the seat body 120 is rotated to the forward usage mode or the backward usage mode, the infrared sensor is aligned with the notch of the rotating framework 131, so that the infrared light passes through the notch and reaches the receiving end, and the infrared sensor is triggered to generate the detection signal. Detection is performed in a non-contact manner, and since there is no physical contact, the sensor is not easy to be damaged due to impact.

In an embodiment, as shown in FIG. 4 to FIG. 6B, the infrared sensor includes a first infrared sensor 211 and a second infrared sensor 212. The notch includes a first notch 1311 and a second notch 1312. The first notch 1311 triggers the first infrared sensor 211 to generate the detection signal when the seat body 120 is rotated to one of the forward usage mode and the backward usage mode; and the second notch 1312 triggers the second infrared sensor 212 to generate the detection signal when the seat body 120 is rotated to the other of the forward usage mode and the backward usage mode.

Specifically, the first notch 1311 and the second notch 1312 may be disposed on a same side of the central axis a of the rotating framework 131 and arranged opposite to each other, and the first infrared sensor 211 and the second infrared sensor 212 may be disposed on a frame on the same side of the rotating framework 131. Regardless of whether the seat body 120 is rotated to the forward usage mode or the backward usage mode, the rotating framework 131 rotated therewith may cause the first notch 1311 to be aligned with the first infrared sensor 211 or cause the second notch 1312 to be aligned with the second infrared sensor 212.

Figure 6A:
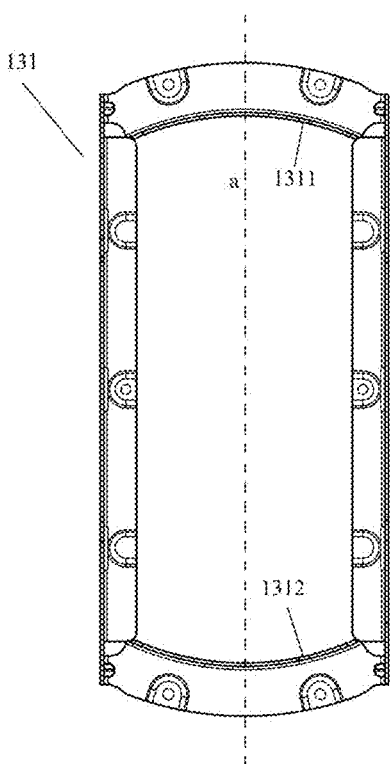
FIG. 6A is a first top view of a rotating framework according to an embodiment.
Figure 6B:
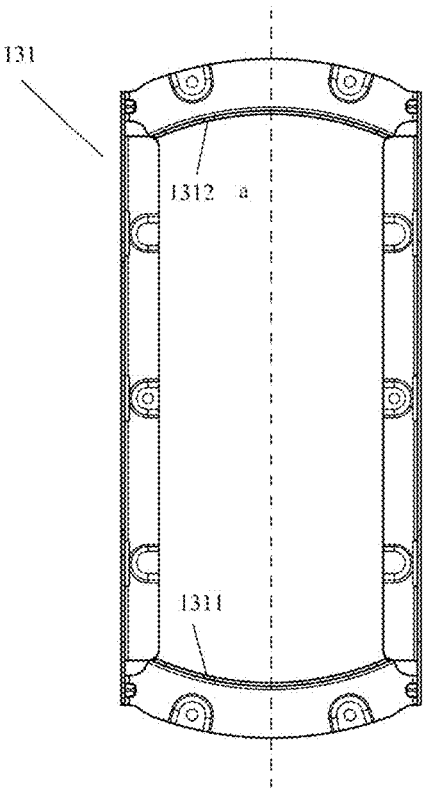
FIG. 6B is a second top view of a rotating framework according to an embodiment.

For example, when the seat body 120 is rotated to the forward usage mode, the first notch 1311 and the second notch 1312 are both located on the right side of the central axis a (as shown in FIG. 6A). In this case, the second notch 1312 is aligned with the second infrared sensor 212, thereby triggering the second infrared sensor 212 to generate the detection signal (referring to FIG. 4). When the seat body 120 is rotated to the backward usage mode, the first notch 1311 and the second notch 1312 are both located on the left side of the central axis a (as shown in FIG. 6B). It can be understood that, after the rotating framework 131 is rotated by 180°, the first notch 1311 is aligned with the first infrared sensor 211, thereby triggering the first infrared sensor 211 to generate the detection signal.

In the above anti-misuse system, the first infrared sensor, the second infrared sensor, the first notch and the second notch are provided, the first notch triggers the first infrared sensor to generate the detection signal when the seat body is in one of the forward usage mode and the backward usage mode, and the second notch triggers the second infrared sensor to generate the detection signal when the seat body is in the other of the forward usage mode and the backward usage mode, so that the current usage mode can be detected by a simple structure, the implementation cost is lower, and the detection precision is high.

Figure 7:
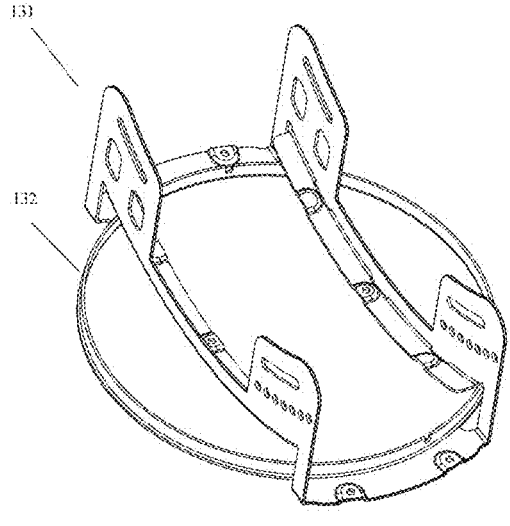
FIG. 7 is a schematic structural diagram of a rotating framework with an additional frame according to an embodiment.

In an embodiment, as shown in FIG. 7, an additional frame 132 is disposed on the rotating framework 131, and the additional frame 132 is provided with a plurality of notches. The additional frame may be annular. The additional frame is provided with a plurality of notches for the detection of the infrared sensor, the detection precision is improved.

In an embodiment, the sensor includes a mechanical switch sensor, the detection point includes a trigger portion disposed on the rotating framework 131. The trigger portion is configured to trigger the mechanical switch sensor to switch an on-off state, so as to generate the detection signal. The mechanical switch sensor is provided with a switch lever, and the trigger portion includes a protrusion for toggling the switch lever. Detection is performed in a physical contact manner, such that the current usage mode can be stably detected.

In an embodiment, the controller 230 is configured to determine that the current usage mode is one of the forward usage mode and the backward usage mode when the detection point triggers the sensor to generate the detection signal; and determine that the current usage mode is the other of the forward usage mode and the backward usage mode when the detection point does not trigger the sensor to generate the detection signal.

Specifically, it is possible to provide only a single detection point and a single sensor, and to preset whether the usage mode, which corresponds to the detection signal generated by the sensor, is the forward usage mode or the backward usage mode. In this way, when the detection point triggers the sensor to generate the detection signal, it may be determined that the current usage mode of the seat body 120 is one of the forward usage mode and the backward usage mode; and when the detection point does not trigger the sensor to generate the detection signal, it may be determined that the seat body 120 is the other of the forward usage mode and the backward usage mode. Therefore, by means of a software method, the hardware structure is simplified, and the implementation cost is reduced.

It should be noted that, although the above embodiment is described by taking it as an example that the sensor is disposed on the base 110 and the detection point is disposed on the seat body 120, those skilled in the art can understand that, based on the characteristics of the rotation of the seat body 120 relative to the base 110, the above embodiments can also be extended to a solution in which the detection point is disposed on the base 110, and the sensor is disposed on the seat body 120.

Figure 8:
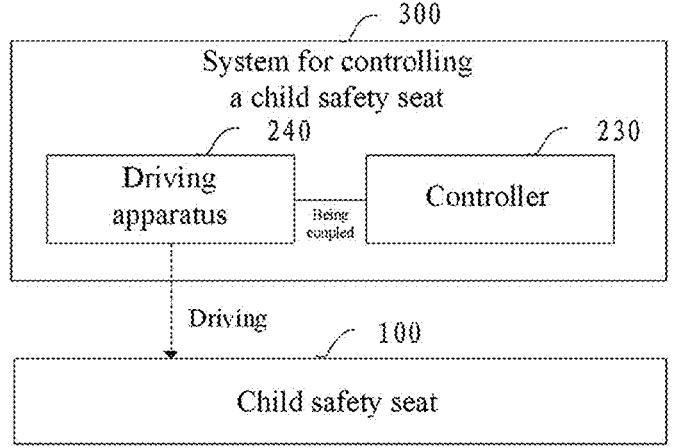
FIG. 8 is a schematic block diagram of a system for controlling a child safety seat according to an embodiment.
Figure 9A:
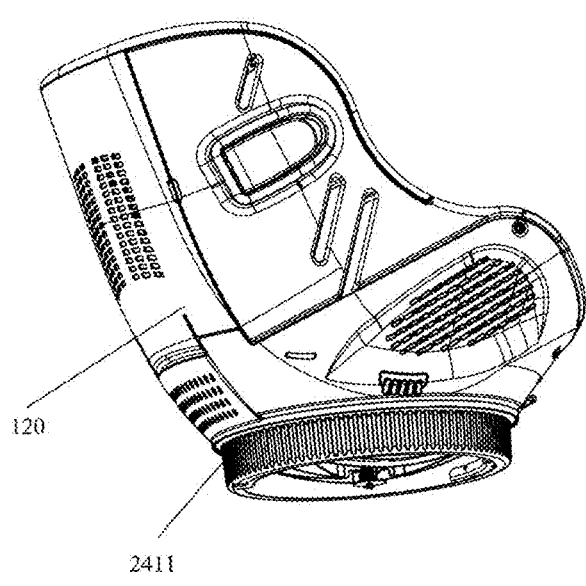
FIG. 9A to FIG. 9G are schematic structural diagrams of a driving apparatus for driving a child safety seat according to an embodiment.
Figure 9B:
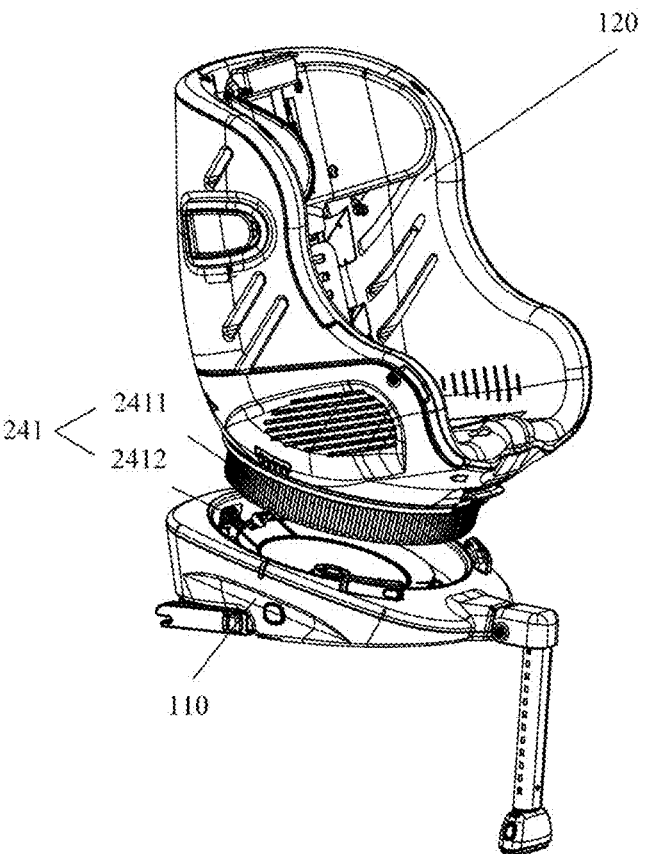
Figure 9C:
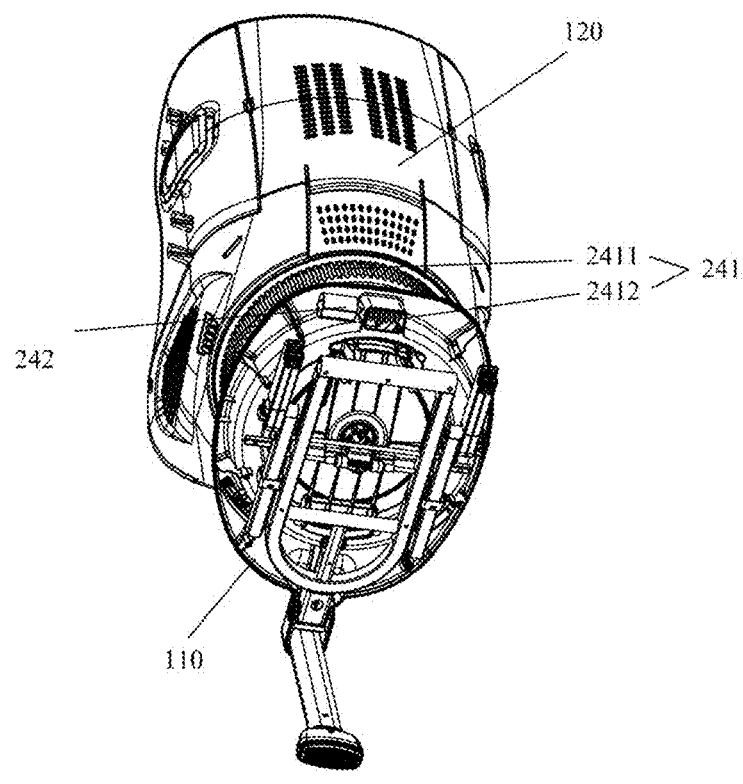
Figure 9D:
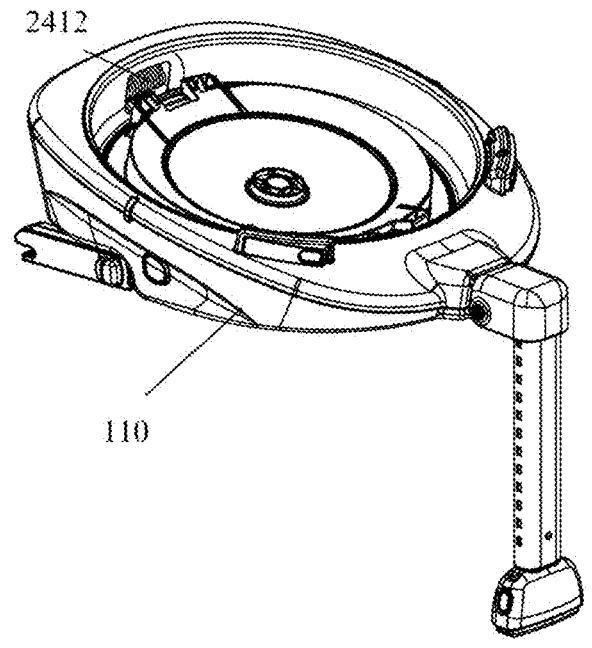
Figure 9E:
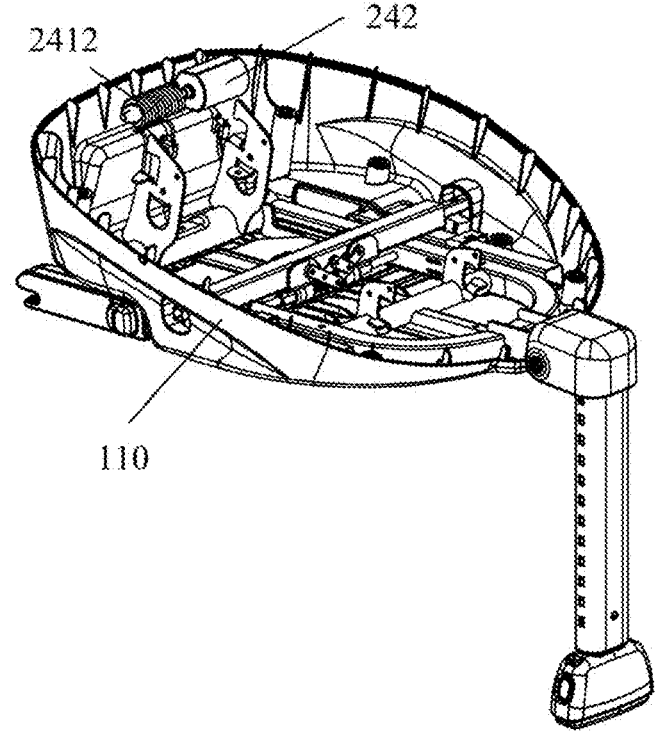
Figure 9F:
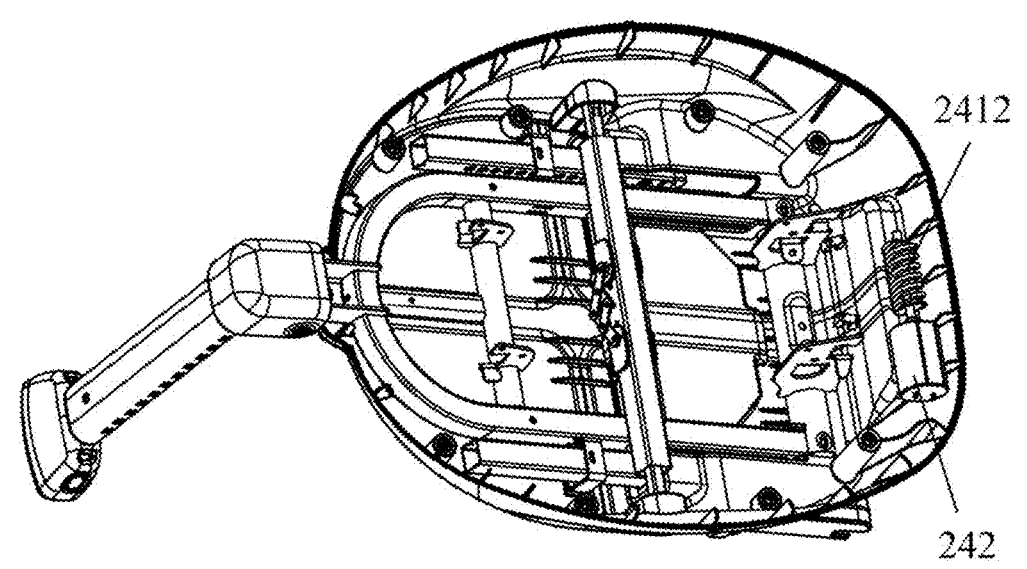
Figure 9G:
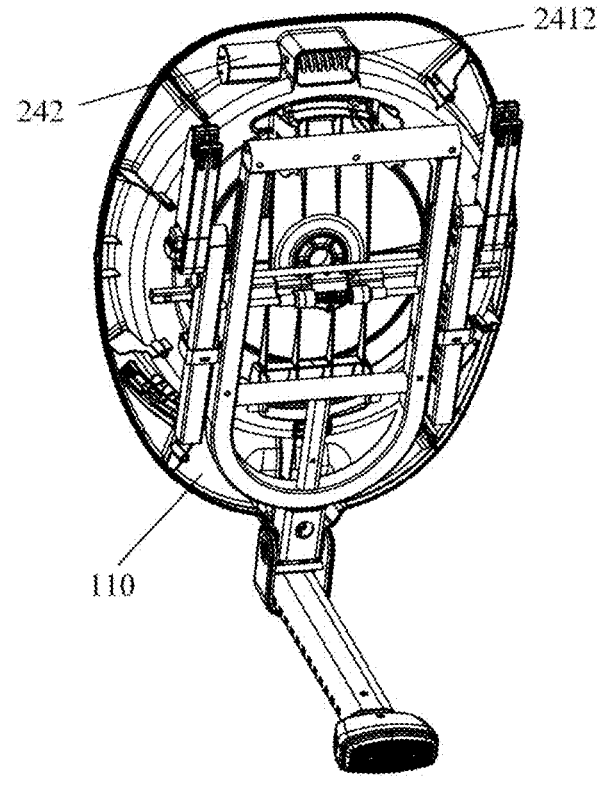

In an embodiment, as shown in FIG. 8, a system 300 for controlling a child safety seat is provided, which is applicable to the child safety seat 100. The system for controlling a child safety seat includes a controller 230 and a driving apparatus 240.

The child safety seat 100 includes a base 110, and a seat body 120 disposed on the base 110. The seat body 120 has a usage mode including a forward usage mode and a backward usage mode. The seat body 120 is switched between the forward usage mode and the backward usage mode by means of rotation relative to the base 110.

The controller 230 is configured to issue a control instruction. The control instruction is used for indicating a target usage mode, and the target usage mode is one of the forward usage mode or the backward usage mode.

The driving apparatus 240 is coupled to the controller 230, and is configured to drive the seat body 120 of the child safety seat 100 to rotate relative to the base 110 of the child safety seat 100 according to the control instruction of the controller 230, so as to adjust to the forward usage mode or the backward usage mode.

Specifically, the controller 230 is coupled to the driving apparatus 240 and is in communication connection with the driving apparatus 240. The controller 230 may be preset with a child attribute, and transmit a corresponding control instruction to the driving apparatus 240 according to the child attribute. For example, the user may preset in the controller 230 that the body weight of an infant is 15 kg, and the controller 230 may transmit a control instruction to the driving apparatus 240 for adjusting to the backward usage mode.

According to the control instruction, the driving apparatus 240 may drive the seat body 120 to rotate relative to the base 110, until the seat body 120 is switched to a usage mode adapted to the child attribute. For example, in a case the seat body 120 is in the forward usage mode, when receiving the control instruction of instructing to adjust the usage mode to the backward usage mode, the driving apparatus 240 drives the seat body 120 to rotate until the seat body 120 is switched to the backward usage mode. Therefore, the seat body can be automatically adjusted to a correct usage mode without a manual operation from the user, thereby avoiding the user misusing the usage mode of the child safety seat, and thus improving the riding safety of a child.

In an embodiment, referring to FIG. 9A to FIG. 9G, the driving apparatus 240 includes a transmission mechanism 241 and a motor 242. The motor 242 is configured to drive the transmission mechanism 241, so as to drive the seat body 120 to rotate. The transmission mechanism 241 includes a worm gear 2411 disposed at the bottom of the seat body 120, and a worm 2412 disposed in the base 110. The motor 242 is disposed in the base 110 and drives the worm 2412 to rotate. When the worm 2412 is rotated, the worm gear 2411 is driven to rotate; and when the worm gear 2411 is rotated, the seat body 120 is driven to rotate.

Specifically, the worm gear 2411 may be disposed on a bottom side edge of the seat body 120, and the motor 242 connected to the worm 2412 is disposed in the base 110. The worm 2412 is driven by the motor 242 to rotate, so as to drive the worm gear 2411 to rotate, thereby driving the seat body 120 to rotate to adjust to the forward usage mode or the backward usage mode. The motor 242 may be controlled by the controller 230. When the worm 2412 is rotated, the worm gear 2411 is driven to rotate, and when the worm gear 2411 is rotated, the seat body 120 is driven to rotate. In this way, the structure is simplified, and the implementation cost is reduced.

In addition to the worm gear and worm mechanism described above, the transmission mechanism 241 may also be implemented as a bevel gear mechanism, a gear rack mechanism, a belt transmission mechanism or a sprocket chain mechanism or the like, and a first transmission connector and a motor connected to a second transmission connector may also be disposed at the center of the bottom of the seat body 120 to implement transmission.

According to an embodiment, the system 300 for controlling a child safety seat further includes an input device disposed on the child safety seat 100. The controller 230 stores child attributes corresponding to different usage modes. The input device is configured to allow the user to input the child attribute who is carried on the child safety seat 100, and transmit the input child attribute to the controller 230. The controller 230 is configured to determine a usage mode to be adjusted according to the input child attribute of the child.

In an embodiment, the system 300 for controlling a child safety seat further includes a communication module, which is coupled to the controller 230 and is in communication connection with an external terminal apparatus, so that the controller 230 issues a control instruction to the driving apparatus 240 according to the operation of the external terminal apparatus. The external terminal apparatus stores the child attributes corresponding to different usage modes.

The external terminal apparatus may also be configured to allow the user to input the child attribute and store the same, so as to determine the usage mode to be adjusted according to the input child attribute, and notify the controller 230, and then the controller 230 issues a corresponding control instruction to the driving apparatus 240.

Since specific input manners of the input device and/or the external terminal apparatus have been described in detail in the foregoing embodiments, details are not described herein again. The user may input the child attribute, such as the age, body weight and body height, via the input device and/or the external terminal apparatus. The controller 230 and/or the external terminal apparatus may store the child attributes corresponding to the usage modes. Therefore, after the child attribute input by the user is obtained, the usage mode to be adjusted can be determined according to the child attribute, so that the seat body 120 can be accurately adjusted to the adapted usage mode.

In one embodiment, the system 300 for controlling a child safety seat further includes a detection apparatus 210. The detection apparatus 210 is configured to detect whether the current usage mode of the seat body 120 is the forward usage mode or the backward usage mode, and transmit information indicating the current usage mode to the controller 230. The controller 230 is configured to issue the control instruction to the driving apparatus 240, when the current usage mode does not conform to the usage mode to be adjusted. The detection apparatus 210 may detect the current usage mode of the seat body 120, and the detection apparatus 210 may transmit the information indicating the current usage mode to the controller 230, so that the controller 230 determines whether the seat body 120 is rotated to the usage mode to be adjusted. When determining that the seat body 120 is not rotated to the usage mode to be adjusted, the controller 230 may correspondingly instruct the driving apparatus 240 to drive the seat body 120 to rotate, until the seat body 120 is rotated to the usage mode to be adjusted. Since the specific structure of the detection apparatus 210 has been described in detail in the foregoing embodiments, details are not described herein again.

In an embodiment, the system 300 for controlling a child safety seat further includes a reminding apparatus 220. The reminding apparatus 220 is configured to execute a reminding operation according to the current usage mode detected by the detection apparatus 210. Since related content of the reminding apparatus 220 has been described in detail in the foregoing embodiments, details are not described herein again.

In an embodiment, the system 300 for controlling a child safety seat further includes a limiting apparatus 250. The limiting apparatus 250 is configured to lock or unlock the seat body 120 according to the current usage mode.

Specifically, the anti-misuse system 200 in the embodiments of the present disclosure limits the rotation of the seat body 120 by means of the limiting apparatus 250. The detection apparatus 210 may detect the current usage mode of the seat body 120. When it is determined that the current usage mode of the seat body 120 is a correct usage mode (that is, the usage mode to be adjusted described above), the limiting apparatus 250 may lock the current usage mode of the seat body 120. When it is determined that the current usage mode of the seat body 120 is a wrong usage mode, the limiting apparatus 250 may unlock the current usage mode of the seat body 120, so that the seat body 120 may be adjusted to the correct usage mode. The limiting apparatus 250 may be implemented in a manner such as an electromagnet.

In the above system for controlling a child safety seat, the seat body is locked by the limiting apparatus when the current usage mode is the correct usage mode, and the seat body is unlocked by the limiting apparatus when the current usage mode is the wrong usage mode, so that the seat body can be adjusted to the correct usage mode, thereby avoiding the user misusing the usage mode of the child safety seat, and thus improving the riding safety of the child.

In an embodiment, the controller 230 is configured to determine whether the current usage mode of the child safety seat 100 matches the child attribute of the child who is currently carried on the child safety seat 100; and lock the seat body 120 via the limiting apparatus 250 in the case of match, and unlock the seat body 120 via the limiting apparatus 250 in the case of mismatch.

In an embodiment, the system 300 for controlling a child safety seat further includes an input device disposed on the child safety seat 100. The controller 230 stores child attributes corresponding to different usage modes. The input device is configured to allow the user to input the child attribute, and transmit the input child attribute to the controller 230.

Specifically, the child safety seat system may be provided with the input device for the user to input the child attribute, such as the age, body weight and body height, of the use object. The input device may transmit the child attribute input by the user to the controller 230. The detection apparatus 210 may detect whether the current usage mode of the seat body 120 is the forward usage mode or the backward usage mode, and then transmit the information indicating the current usage mode to the controller 230. The controller 230 may compare the child attribute corresponding to the current usage mode with the stored child attribute, and in the case of match, the controller 230 determines that the current usage mode is a correct usage mode, and controls the limiting apparatus 250 to lock the seat body 120; and in the case of mismatch and that the limiting apparatus 250 locks the seat body 120, the controller controls the limiting apparatus 250 to perform unlocking. In addition, the user may also input the child attribute via the external terminal apparatus.

In an embodiment, the anti-misuse system further includes a reminding apparatus 220. The reminding apparatus 220 is configured to execute a reminding operation according to the current usage mode detected by the detection apparatus 210.

Specifically, when determining that the current usage mode is not the correct usage mode, the controller 230 may control the reminding apparatus 220 to remind the user, and after receiving the reminding, the user may adjust the usage mode of the seat body 120. When the seat body 120 is adjusted to the correct usage mode, the controller 230 may control the reminding apparatus 220 to stop reminding. By means of reminding the user via the reminding apparatus, it is possible to effectively help the user to adjust the seat to an adapted usage mode, thereby avoiding the user misusing the usage mode of the child safety seat, and thus improving the riding safety of the child.

Figure 10:
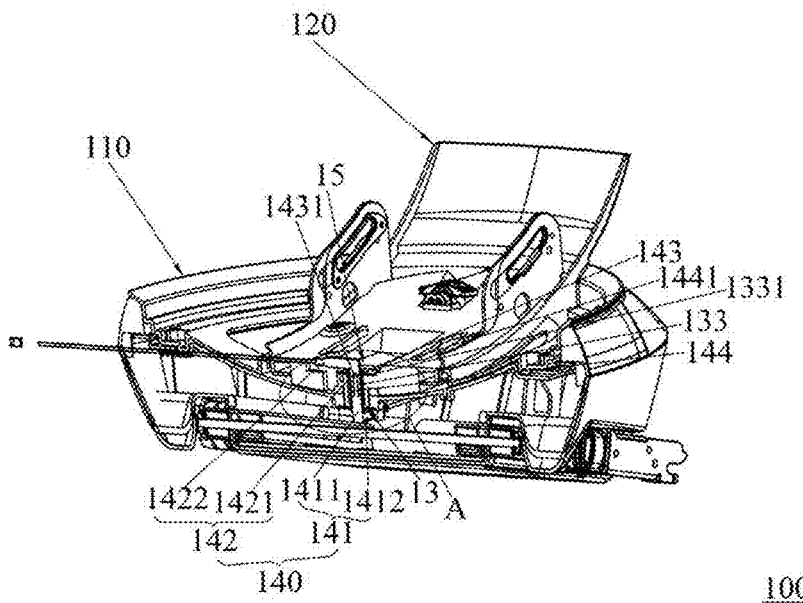
FIG. 10 is a sectional view of a child safety seat according to an embodiment.
Figure 11:
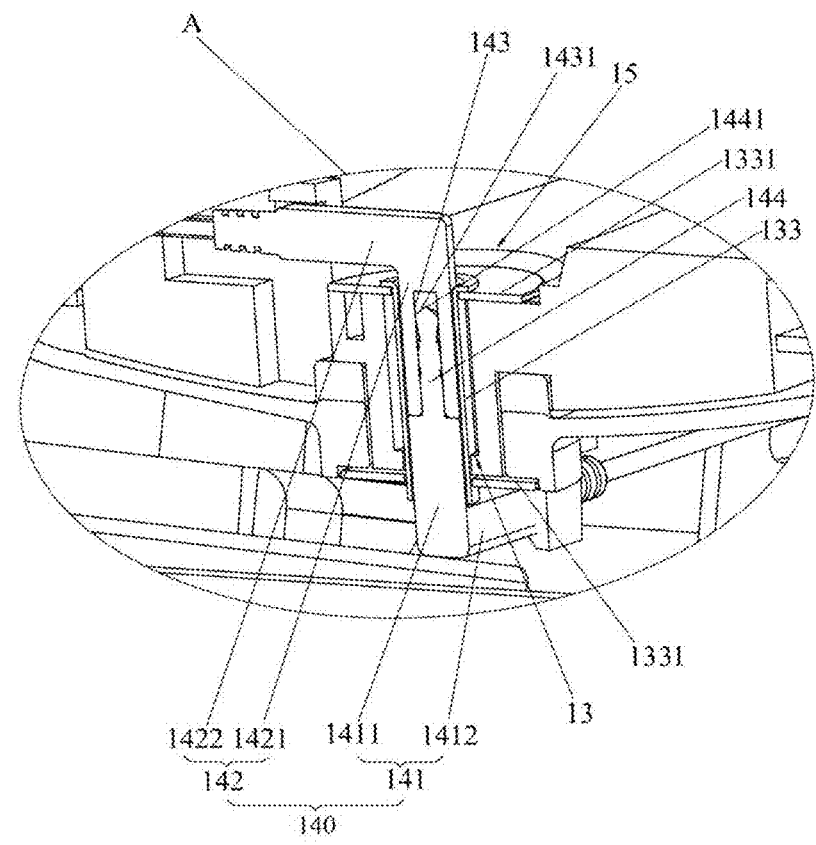
FIG. 11 is a partial enlarged view of a location A in FIG. 10.
Figure 12:
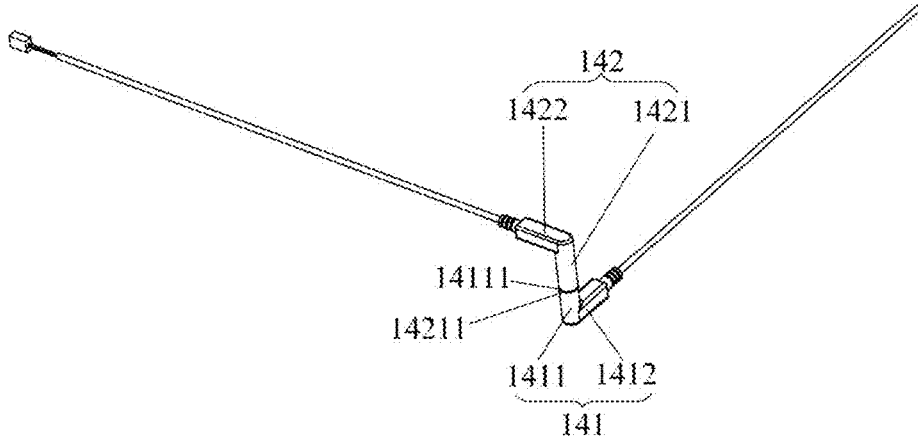
FIG. 12 is a schematic structural diagram of an electrical pivoting member according to an embodiment.
Figure 13:
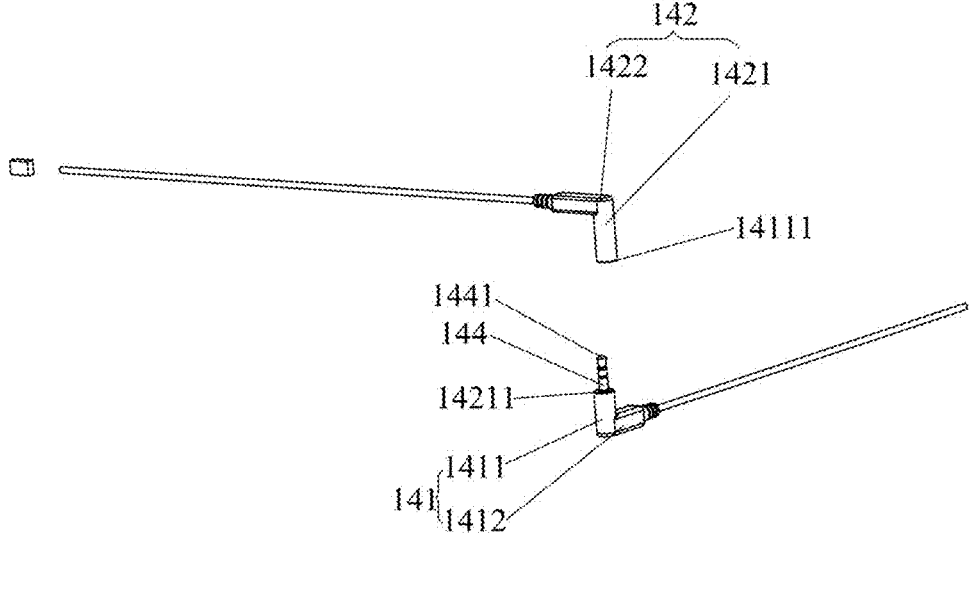
FIG. 13 is a schematic exploded structural diagram of an electrical pivoting member according to an embodiment.

In an embodiment, as shown in FIG. 10, a child safety seat 100 is provided. The child safety seat 100 includes: a base 110: a seat body 120 disposed on the base 110; and an electrical pivoting member 140. The electrical pivoting member 140 includes a base pivoting member 141 and a body pivoting member 142, which are pivoted and coupled to each other. The base pivoting member 141 is disposed on the base 110, and the body pivoting member 142 is disposed on the seat body 120, so as to exchange a signal generated by the base 110 with a signal generated by the seat body 120.

The seat body 120 is rotatably connected to the base 110. At least one first electrical device is disposed in the base 110, and at least one second electrical device is disposed in the seat body 120. The seat body 120 is rotated relative to the base 110 via a rotating shaft. The base pivoting member 141 is configured to be electrically connected to a first electrical device in the base. The body pivoting member 142 is configured to be electrically connected to a second electrical device in the seat body. The base pivoting member 141 is fixedly connected to the base 110, and the base pivoting member 141 is provided with a base conductive portion 1411. The body pivoting member 142 is fixedly connected to the seat body 120, and the body pivoting member 142 is provided with a body conductive portion 1421. The base conductive portion 1411 is rotatably and electrically connected to the body conductive portion 1421 in the rotating shaft. The first electrical device in the base is electrically conducted to the second electrical device in the seat body by means of an electrical connection between the base conductive portion 1411 and the body conductive portion 1421.

First, it should be noted that, the seat body 120 and the base 110 of the child safety seat 100 may be provided with various electrical devices such as a detection apparatus, a reminding apparatus, a controller, a driving apparatus and a limiting apparatus. An electrical connection between the electrical devices may be implemented, for example, by cables. However, in the rotation process of the seat body 120 relative to the base 110, the cables for connecting the electrical devices may be rotated accordingly, which may cause the cables to intertwine with each other, thereby affecting the service lives of the electrical devices.

In the embodiments of the present disclosure, the child safety seat 100 includes the base 110 and the seat body 120 rotatably connected to the base 110 and configured to provide a riding space. The base 110 is rotatably connected to the seat body 120 via the rotating shaft 13. In order to prevent the cables connected between the first and second electrical devices of the child safety seat 100 from moving with the rotation of the base 110 and the seat body 120, the child safety seat 100 further includes the electrical pivoting member 140, and the electrical pivoting member 140 includes the base pivoting member 141 configured to be electrically connected to the first electrical device (not shown in FIG. 10) in the base 110, and the body pivoting member 142 configured to be electrically connected to the second electrical device (not shown in FIG. 10) in the seat body 120. The base pivoting member 141 is fixedly connected to the base 110, the body pivoting member 142 is fixedly connected to the seat body 120. The base pivoting member 141 is provided with the base conductive portion 1411, and the body pivoting member 142 is provided with the body conductive portion 1421. The base conductive portion 1411 and the body conductive portion 1421 are rotatably and electrically connected in the rotating shaft 13, and the first electrical device is electrically conducted with the second electrical device by means of the electrical connection between the base conductive portion 1411 and the body conductive portion 1421.

When the child safety seat 100 is rotated, the base conductive portion 1411 and the body conductive portion 1421 are rotated synchronously with the rotation of the base 110 and the seat body 120. The body pivoting member 142 is fixedly connected to the seat body 120 and the base pivoting member 141 is fixedly connected to the base 110, therefore, the body pivoting member 142 is in a static state relative to the second electrical device, and the base pivoting member 141 is also in a static state relative to the first electrical device. On one hand, in the case that the first electrical device and the second electrical device are directly connected by the electrical pivoting member 140, since there is no cable between the first electrical device and the second electrical device, cable intertwining is avoided, thereby solving the technical problem of cable intertwining. On the other hand, in the case that the second electrical device is electrically connected to the body pivoting member 142 by a cable, and the first electrical device is also electrically connected to the base pivoting member 141 by a cable, since the body pivoting member 142 is in the static state relative to the second electrical device and the base pivoting member 141 is also in the static state relative to the first electrical device, the cable connected between the body pivoting member 142 and the second electrical device and the cable connected between the base pivoting member 141 and the first electrical device are both in the static state, that is, the cables may not move along with the rotation of the child safety seat 100, thereby avoiding the cable intertwining, which can also solve the technical problem of cable intertwining. Therefore, in the child safety seat 100 in the embodiments of the present disclosure, instead of the conventional cable connection of the electrical devices, the electrical devices are electrically connected by the electrical pivoting member 140, which has a simple structure and avoids the cable intertwining.

Referring to FIG. 10 to FIG. 13, the base conductive portion 1411 and the body conductive portion 1421 are of a conductive and rotatable plugging structure. The body conductive portion 1421 has a conductive recessed structure 143, and the base conductive portion 1411 has a conductive protruding structure 144 that may be plugged into and pulled out from the recessed structure 143, therefore, the plugging structure may be composed of two portions, that is, the recessed structure 143 and the protruding structure 144. In order to protect a conductor, the recessed structure 143 is wrapped with a first insulating shell 14111, and the base pivoting member 141 below the protruding structure 144 is wrapped with a second insulating shell 14211, that is, the protruding structure 144 is protruded out of the second insulating shell 14211. The protruding structure 144 may be plugged into and pulled out from the recessed structure 143. The bottom of the recessed structure 143 is provided with a concave platform 1431, and the top of the protruding structure 144 is provided with a conical portion 1441 that matches the concave platform 1431. The conical portion 1441 is of a chamfer structure, and the chamfer structure has a certain guiding effect, such that the protruding structure 144 can be conveniently plugged into the recessed structure 143. When the protruding structure 144 is plugged into the recessed structure 143, the second insulating shell 14211 is in abutting contact with the first insulating shell 14111, and an abutting contact location is of a smooth structure. Of course, the recessed structure 143 may also be disposed on the base conductive portion 1411, and the conductive protruding structure 144, which may be plugged into and pulled out from the recessed structure 143, is disposed on the body conductive portion 1421.

With continued reference to FIG. 10, the rotating shaft 13 connected between the base 110 and the seat body 120 includes a rotating shaft body 133 with a hollow structure. Each of two ends of the rotating shaft body 133 extends outward to form a shoulder 1331. Meanwhile, a mounting hole 15, which matches the rotating shaft 13, is formed in a rotatable connection location of the seat body 120 and the base 110. The rotating shaft 13 is mounted in the mounting hole 15. The base conductive portion 1411 and the body conductive portion 1421 are accommodated in the hollow structure of the rotating shaft 13. In addition, in addition to the body conductive portion 1421, the body pivoting member 142 further includes a body connecting portion 1422 for connecting to the seat body 120. A plane where the body connecting portion 1422 is located is orthogonal to a plane where the body conductive portion 1421 is located. Similarly, in addition to the base conductive portion 1411, the base pivoting member 141 further includes a base connecting portion 1412, and a plane where the base connecting portion 1412 is located is orthogonal to a plane where the base conductive portion 1411 is located. The orthogonal arrangement facilitates the smooth rotation of the base conductive portion 1411 and the body conductive portion 1421.

In an embodiment, the first electrical device in the base 110 or the second electrical device in the seat body 120 includes at least one of a detection apparatus, a reminding apparatus, a controller, a driving apparatus and a limiting apparatus. The second electrical device in the seat body 120 may also be a detection apparatus for detecting whether a top strap of the seat body 120 is tightened, and the first electrical device in the base 110 may also be an indicator for displaying tightening state information of the top strap. In use, the user may clearly know whether the top strap is in a tightened state according to the indicator. When the top strap is tightened, the indicator displays green, and when the top strap is in a non-tightened state, the indicator displays red.

Figure 14:
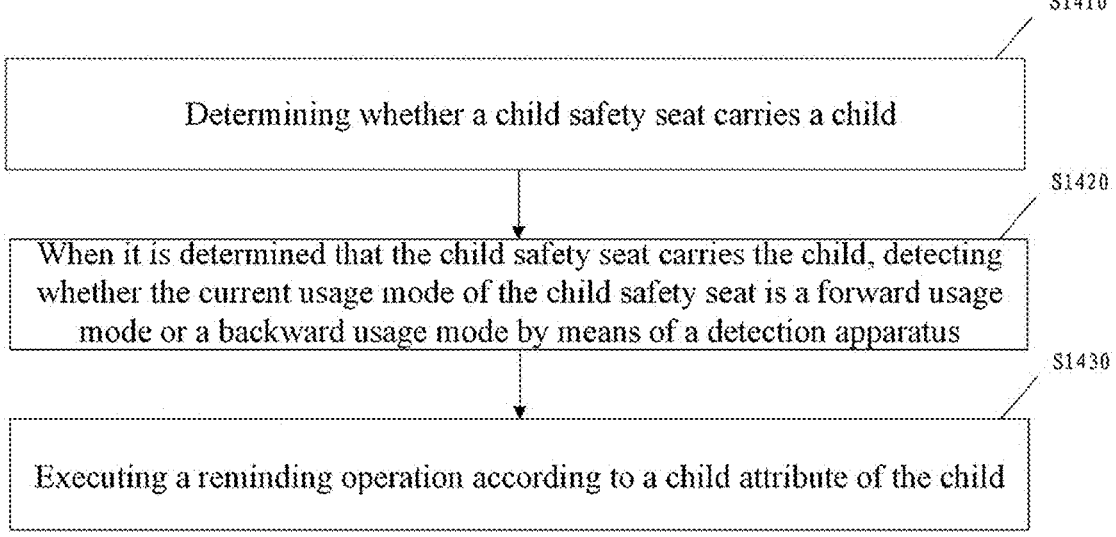
FIG. 14 is a schematic flow diagram of a method for anti-misuse control of a child safety seat according to an embodiment.

In an embodiment, as shown in FIG. 14, method for anti-misuse control of a child safety seat a method for anti-misuse control of a child safety seat is provided, the method for anti-misuse control of a child safety seat includes the following steps.

In step S1410, whether the child safety seat carries a child is determined;

In step S1420, when it is determined that the child safety seat carries a child, by means of a detection apparatus, whether the current usage mode of the child safety seat is a forward usage mode or a backward usage mode is detected; and In step S1430, a reminding operation is executed according to a child attribute of the child.

Specifically, whether the current usage mode of the seat body 120 is the forward usage mode or the backward usage mode may be detected by the detection apparatus 210 in the foregoing embodiments, and then the reminding operation is executed by the reminding apparatus 220. Since the foregoing detection and reminding processes have been described in detail in the foregoing embodiments, details are not described herein again.

In an embodiment, the reminding operation may include one or more of the following operations: a current mode reminding, which is used for reminding that the child safety seat is currently in the forward usage mode or the backward usage mode: an adapted attribute reminding, which is used for reminding a child attribute adapted to the current usage mode of the child safety seat: a mode mismatch reminding, which is used for reminding that the current usage mode of the child safety seat is not adapted to the child attribute of the child: an attribute reset reminding, which is used for reminding to reset the child attribute of the child: or an orientation anomaly reminding, which is used for reminding that the orientation of the child safety seat does not conform to either the forward usage mode or the backward usage mode.

Since the foregoing various reminding operations have been described in detail in the foregoing embodiments, details are not described herein again.

In an embodiment, the step S1430 may include at least one of the following operations:

according to the current usage mode of the child safety seat, a reminder is triggered to execute the current mode reminding and/or the adapted attribute reminding: the child attribute of the child is compared with the child attribute adapted to the current usage mode, and the reminder is triggered to execute the mode mismatch reminding and/or the attribute reset reminding in the case of mismatch: the orientation anomaly of the child safety seat is determined according to a detection signal of the detection apparatus, and the reminder is triggered to execute the orientation anomaly reminding: the information indicating the current usage mode is transmitted to an external terminal apparatus, so that the external terminal apparatus executes the current mode reminding and/or the adapted attribute reminding, and/or, the child attribute of the child is compared with the child attribute adapted to the current usage mode of the child safety seat, and the mode mismatch reminding and/or the attribute reset reminding is executed in the case of mismatch: or the orientation anomaly of the child safety seat is determined according to the detection signal of the detection apparatus, and the orientation anomaly information is sent to the external terminal apparatus, so that the external terminal apparatus executes the orientation anomaly reminding.

The reminding operation executed by the reminder and/or the external terminal apparatus has been described in detail in the foregoing embodiments, and thus details are not described herein again.

In the above method for anti-misuse control of a child safety seat, by means of providing the reminder on the seat body and/or the base, the user can receive reminding information in time, thereby effectively avoiding the user misusing the usage mode of the child safety seat, and thus improving the riding safety of the child. In addition, the remote communication with the controller and various reminding operations are performed by the remote communication function and a multimedia playing function of the external terminal apparatus, and there is no need to deploy hardware for executing reminding on the child safety seat, thereby reducing the cost of the child safety seat. Meanwhile, the user can receive the reminding information in time, thereby effectively avoiding the user misusing the usage mode of the child safety seat, and thus improving the riding safety of the child.

In an embodiment, the child attribute of the child includes at least one of age, body weight, or body height.

In an embodiment, the method for anti-misuse control of a child safety seat further includes: controlling, by means of a driving apparatus, a seat body of the child safety seat to rotate relative to a base of the child safety seat, so as to adjust to the forward usage mode or the backward usage mode.

Specifically, the rotation of the seat body relative to the base may be implemented by the driving apparatus 240 in the foregoing embodiments. Since the specific structure and the working principle of the driving apparatus 240 have been described in detail in the foregoing embodiments, details are not described herein again.

In the method for anti-misuse control of a child safety seat, the seat body can be automatically adjusted to the correct usage mode without a manual operation of the user, thereby avoiding the user misusing the usage mode of the child safety seat, and thus improving the riding safety of the child. Meanwhile, user operations can also be saved, and the adjustment efficiency of the child safety seat can be improved.

Figure 15:
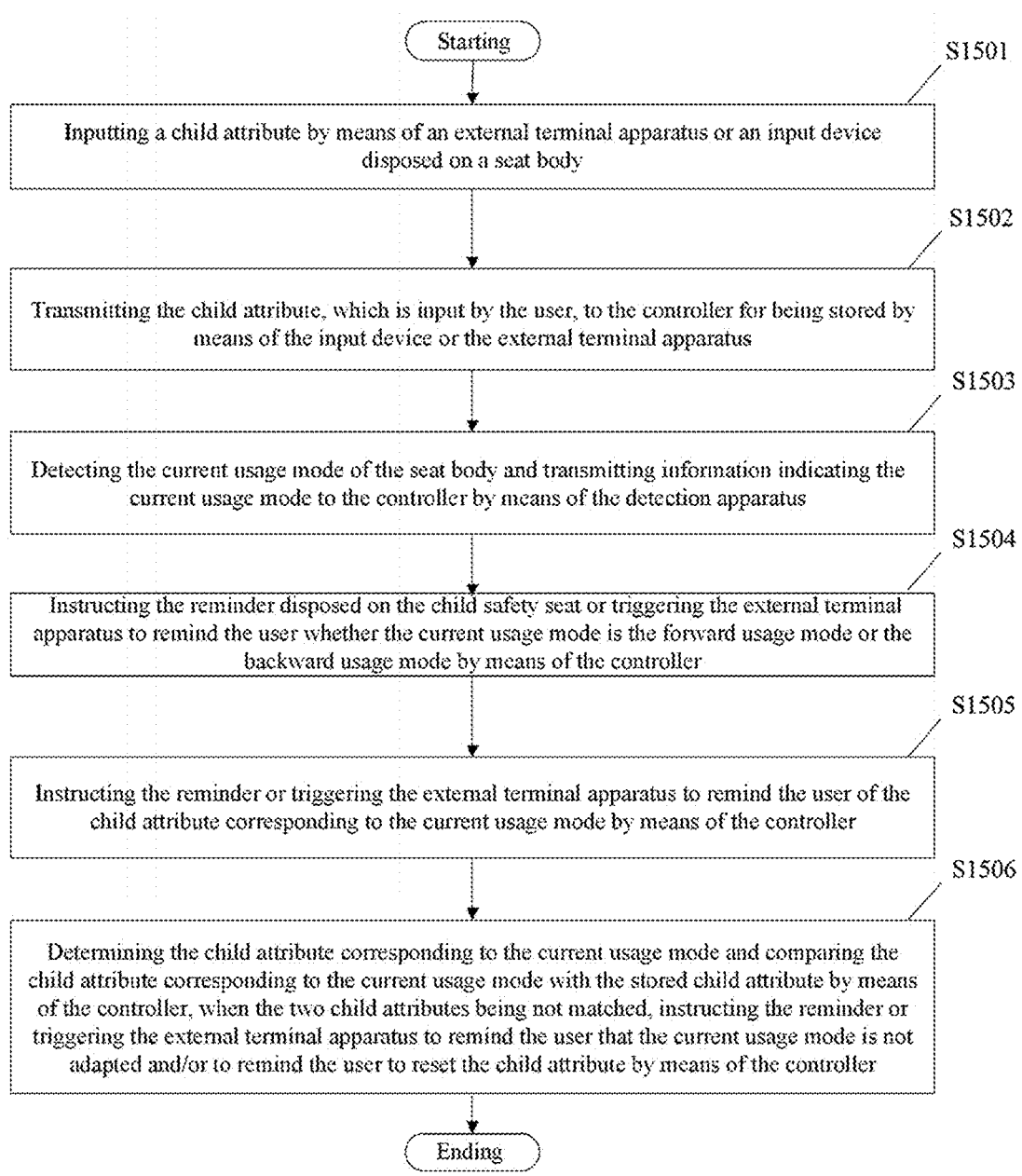
FIG. 15 is a flow diagram of a specific example of a method for anti-misuse control of a child safety seat according to an embodiment.

In order to facilitate those skilled in the art to deeply understand the embodiments of the present disclosure, a description is given below in combination with specific flow examples. Referring to FIG. 15, it shows a flow diagram of a specific example of the method for anti-misuse control of a child safety seat. The method for anti-misuse control of a child safety seat includes the following steps:

in step S1501, the user may input the child attribute, such as the age, body weight or body height, of a child who is currently carried on the child safety seat 100 by means of the external terminal apparatus or the input device disposed on the seat body 120;

in step S1502, the input device or the external terminal apparatus transmits the child attribute, which is input by the user, to the controller 230, and the controller 230 stores the child attribute;

in step S1503, the detection apparatus 210 detects the current usage mode of the seat body 120, and transmits information indicating the current usage mode to the controller 230;

in step S1504, the controller 230 instructs the reminder which is disposed on the child safety seat 100 or triggers the external terminal apparatus to remind the user that the current usage mode is the forward usage mode or the backward usage mode, so that the user determines whether the current usage mode of the seat body 120 is adapted to the child;

in step S1505, the controller 230 instructs the reminder or triggers the external terminal apparatus to remind the user of the child attribute corresponding to the current usage mode, so that the user determines whether the usage mode of the seat body 120 needs to be adjusted; and in step S1506, the controller 230 further determines the child attribute corresponding to the current usage mode, and compares the child attribute corresponding to the current usage mode with the stored child attribute, and when determining that the two child attributes are not matched, the controller 230 instructs the reminder or triggers the external terminal apparatus to remind the user that the current usage mode is not adapted and/or to remind the user to reset the child attribute.

Figure 16:
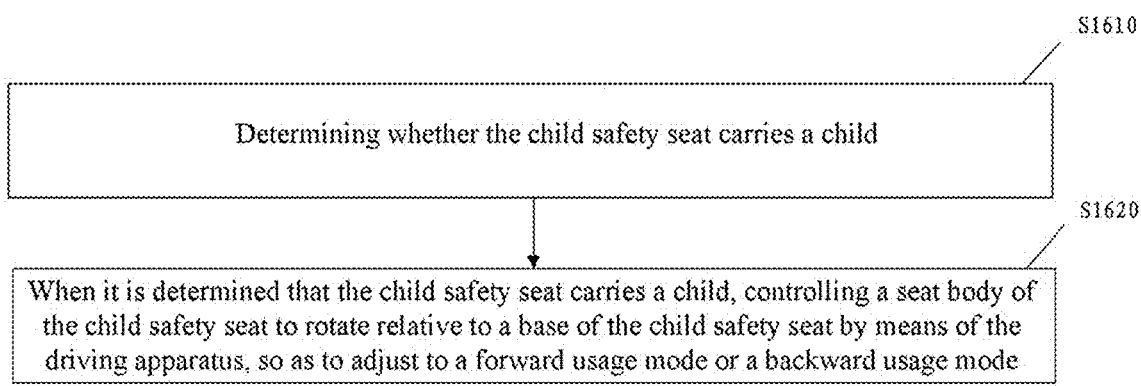
FIG. 16 is a schematic flow diagram of a method for anti-misuse control of a child safety seat according to an embodiment.

In an embodiment, as shown in FIG. 16, a method for controlling a child safety seat is provided, the method for controlling a child safety seat includes the following steps:

in step S1610, whether the child safety seat carries a child is determined; and in step S1620, when it is determined that the child safety seat carries a child, a seat body of the child safety seat is controlled to rotate relative to a base of the child safety seat by means of the driving apparatus, so as to adjust to a forward usage mode or a backward usage mode.

Specifically, the seat body may be controlled by the driving apparatus 240 in the foregoing embodiments to rotate relative to the base. Since the specific structure and the working principle of the driving apparatus 240 have been described in detail in the foregoing embodiments, details are not described herein again.

In the above method for controlling a child safety seat, the seat body can be automatically adjusted to the correct usage mode without a manual operation of the user, thereby avoiding the user misusing the usage mode of the child safety seat, and thus improving the riding safety of the child. Meanwhile, user operations can be saved, and the adjustment efficiency of the child safety seat can be improved.

In an embodiment, the method for controlling a child safety seat further includes:

determining whether the current usage mode of the child safety seat matches a child attribute of the child; and locking the seat body means of a limiting apparatus in the case of match, and unlocking the seat body means of the limiting apparatus in the case of mismatch.

Specifically, the seat body may be locked or unlocked by the limiting apparatus 250 in the foregoing embodiments. Since the specific structure and the working principle of the limiting apparatus 250 have been described in detail in the foregoing embodiments, details are not described herein again.

In the above method for controlling a child safety seat, when the current usage mode is a correct usage mode, the seat body is locked by the limiting apparatus, and when the current usage mode is a wrong usage mode, the seat body is unlocked by the limiting apparatus, so that the seat body can be adjusted to the correct usage mode, thereby avoiding the user misusing the usage mode of the child safety seat, and thus improving the riding safety of the child.

The invention claimed is:

1. An anti-misuse system applicable to a child safety seat, comprising: a detection apparatus configured to detect whether a current usage mode of a seat body is a forward usage mode or a backward usage mode; and a reminding apparatus coupled to the detection apparatus, and configured to execute a reminding operation according to the current usage mode detected by the detection apparatus, wherein the child safety seat comprises a detection point, the detection apparatus comprises a sensor, one of the sensor and the detection point is disposed on the seat body of the child safety seat, and the other of the sensor and the detection point is disposed on a base, the sensor or the detection point, which is disposed on the seat body, is rotated along with the seat body, when the seat body is rotated to the forward usage mode or the backward usage mode, the detection point triggers the sensor to generate a detection signal, so as to determine whether the current usage mode is the forward usage mode or the backward usage mode; and wherein a rotating body is disposed at a bottom of the seat body, a rotating framework is disposed on the rotating body, the rotating framework is rotated along with the rotating body, the detection point is disposed on the rotating framework, and the sensor is disposed on the base, and wherein the detection point comprises a notch disposed on the rotating framework, and when the notch is in a sensing range of the sensor, the sensor is triggered to generate the detection signal.

2. The anti-misuse system of claim 1, wherein the sensor is an infrared sensor, and the infrared sensor comprises a first infrared sensor and a second infrared sensor, and the notch comprises: a first notch triggering the first infrared sensor to generate the detection signal when the seat body is rotated to one of the forward usage mode and the backward usage mode; and a second notch triggering the second infrared sensor to generate the detection signal when the seat body rotates to the other of the forward usage mode and the backward usage mode.

3. The anti-misuse system of claim 2, wherein an additional frame is disposed on the rotating framework, and the additional frame is provided with a plurality of notches.

4. The anti-misuse system of claim 1, further comprising a controller, which is configured to determine that the current usage mode is one of the forward usage mode and the backward usage mode when the detection point triggers the sensor to generate the detection signal, and determine that the current usage mode is the other of the forward usage mode and the backward usage mode when the detection point does not trigger the sensor to generate the detection signal.

5. The anti-misuse system of claim 1, wherein the sensor comprises a mechanical switch sensor, the detection point comprises a trigger portion disposed on the rotating framework, and the trigger portion is configured to trigger the mechanical switch sensor to switch an on-off state, so as to generate the detection signal, wherein the mechanical switch sensor is provided with a switch lever; and the trigger portion comprises a protrusion for toggling the switch lever.

6. The anti-misuse system of claim 1, further comprising an external terminal apparatus and/or an input device which is disposed on the child safety seat, wherein the external terminal apparatus and/or the input device is configured to allow a user to input a child attribute, and the child attribute is used for executing the reminding operation, wherein the reminding apparatus is configured to execute at least one operation of: playing reminding voice, displaying reminding characters, displaying a reminding image, or playing a reminding video.

\* \* \* \* \*